(12) United States Patent
Goldey et al.

(10) Patent No.: US 9,288,425 B2
(45) Date of Patent: Mar. 15, 2016

(54) METHOD AND SYSTEM FOR TOASTED VIDEO DISTRIBUTION

(75) Inventors: Greg Goldey, Castlerock, CO (US); Casey Manuel Paiz, Denver, CO (US); Kerry Phillip Langloys Miller, Hermosa Beach, CA (US); John Card, II, Lakewood, CO (US); David Christopher St. John-Larkin, Denver, CO (US); Scott Higgins, Cherry Hills Village, CO (US); Hugh Aaron Selway, Cheyenne, WY (US); Daniel Mark Overbaugh, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 152 days.

(21) Appl. No.: 12/831,994

(22) Filed: Jul. 7, 2010

(65) Prior Publication Data

US 2010/0295995 A1     Nov. 25, 2010

Related U.S. Application Data

(62) Division of application No. 11/463,214, filed on Aug. 8, 2006.

(60) Provisional application No. 60/707,504, filed on Aug. 11, 2005.

(51) Int. Cl.
    *H04N 9/74*        (2006.01)
    *H04N 5/45*        (2011.01)
    *H04N 5/445*      (2011.01)
    (Continued)

(52) U.S. Cl.
    CPC ............. *H04N 5/45* (2013.01); *H04N 5/44591* (2013.01); *H04N 7/163* (2013.01); *H04N 21/2343* (2013.01); *H04N 21/2665* (2013.01);
    (Continued)

(58) Field of Classification Search
    USPC ................... 348/23, 725–726, 731–733, 738, 348/563–569, 584, 570, 734, 553–558; 725/39, 41, 43–47, 53, 151; 386/55, 386/52–53
    IPC ....................................................... H04N 9/74
    See application file for complete search history.

(56) References Cited

U.S. PATENT DOCUMENTS

| 5,512,936 A | 4/1996 | Burton et al. |
| 5,557,724 A | 9/1996 | Sampat et al. |

(Continued)

FOREIGN PATENT DOCUMENTS

| EP | 1 246 465 | 10/2002 |
| WO | 2005/107245 | 11/2005 |

OTHER PUBLICATIONS

PCT/US2007/017857 International Search Report and Written Opinion of the International Searching Authority mailed Jul. 31, 2008, 9 pages.

(Continued)

*Primary Examiner* — Trang U Tran
(74) *Attorney, Agent, or Firm* — Seed IP Law Group PLLC

(57) ABSTRACT

The systems and methods disclosed transmit a composite channel to a receiver. The composite channel may be a static channel that contains different original channels of content in different locations on a displayed page, or may be a dynamic channel that is processed by the receiver to display a multiple different video streams on a single display device.

21 Claims, 9 Drawing Sheets

(51) Int. Cl.
  *H04N 7/16*       (2011.01)
  *H04N 21/2343*    (2011.01)
  *H04N 21/2665*    (2011.01)
  *H04N 21/431*     (2011.01)
  *H04N 21/81*      (2011.01)

(52) U.S. Cl.
  CPC ....... *H04N21/4312* (2013.01); *H04N 21/4314* (2013.01); *H04N 21/8106* (2013.01)

(56) References Cited

U.S. PATENT DOCUMENTS

| | | | |
|---|---|---|---|
| 5,768,539 | A | 6/1998 | Metz et al. |
| 5,903,314 | A * | 5/1999 | Niijima et al. .................. 725/44 |
| 5,966,120 | A | 10/1999 | Arazi et al. |
| 6,005,565 | A | 12/1999 | Legall et al. |
| 6,031,580 | A | 2/2000 | Sim |
| 6,072,936 | A * | 6/2000 | Koyama ........................ 386/241 |
| 6,405,371 | B1 | 6/2002 | Oosterhout et al. ............ 725/39 |
| 6,526,583 | B1 | 2/2003 | Auld et al. |
| 6,615,039 | B1 | 9/2003 | Eldering |
| 6,804,827 | B1 | 10/2004 | Furukawa et al. |
| 7,076,150 | B2 | 7/2006 | Morinaga et al. |
| 7,202,915 | B2 | 4/2007 | Desch ............................ 348/725 |
| 7,373,650 | B1 | 5/2008 | Rodriguez et al. .............. 725/41 |
| 7,395,546 | B1 | 7/2008 | Asmussen |
| 7,474,359 | B2 | 1/2009 | Sullivan et al. |
| 7,712,117 | B1 | 5/2010 | Mohr ............................... 725/41 |
| 7,769,270 | B2 * | 8/2010 | Nakamura et al. ............ 386/280 |
| 7,804,861 | B2 | 9/2010 | Kim |
| 7,873,972 | B2 * | 1/2011 | Zaslavsky et al. .............. 725/41 |
| 7,953,871 | B2 | 5/2011 | Kuz et al. |
| 7,962,942 | B1 | 6/2011 | Craner |
| 7,982,806 | B2 * | 7/2011 | Otsuka et al. ................. 348/565 |
| 8,074,254 | B2 | 12/2011 | Hisamatsu et al. |
| 8,640,172 | B2 * | 1/2014 | Rodriguez et al. ............. 725/58 |
| 2001/0027555 | A1 | 10/2001 | Franken et al. |
| 2002/0012069 | A1 | 1/2002 | Murakami et al. |
| 2002/0057893 | A1 | 5/2002 | Wood et al. |
| 2002/0191116 | A1 * | 12/2002 | Kessler et al. ................. 348/723 |
| 2003/0023987 | A1 | 1/2003 | Hiramoto et al. |
| 2003/0070174 | A1 | 4/2003 | Solomon |
| 2003/0204853 | A1 | 10/2003 | Fries et al. |
| 2003/0217362 | A1 | 11/2003 | Summers et al. |
| 2003/0233451 | A1 | 12/2003 | Ludvig et al. |
| 2004/0091249 | A1 | 5/2004 | Mekenkamp et al. |
| 2004/0268406 | A1 | 12/2004 | Sparrell et al. |
| 2004/0268410 | A1 | 12/2004 | Barton et al. |
| 2005/0071882 | A1 | 3/2005 | Rodriguez et al. |
| 2005/0144651 | A1 | 6/2005 | Prus et al. |
| 2006/0184983 | A1 | 8/2006 | Casey |
| 2006/0259944 | A1 | 11/2006 | Tash |
| 2007/0186249 | A1 | 8/2007 | Plourde, Jr. et al. |
| 2008/0184327 | A1 | 7/2008 | Ellis et al. |
| 2008/0271106 | A1 | 10/2008 | Patel |
| 2008/0301750 | A1 | 12/2008 | Silfvast et al. |
| 2009/0113486 | A1 | 4/2009 | Bansal et al. |

OTHER PUBLICATIONS

Dish Network. Dish Network Interactive Television, Nov. 29, 2007, 1 page, http://www.dishnetwork.com/content/our_products/interactive_tvlindex.shtml.
Dish Network, ITV-What's New, Nov. 29, 2007, 1 page, http://www.dishnetwork.com/content/our_products/interactive_tv/whats_new/index.shtml.

* cited by examiner

| Description | Name |
|---|---|
| NBC | NBCHL |
| MSNBC | MSNBC |
| CNBC | CNBC |
| USA | USA |
| Bravo | BRAVO |
| Telemundo | TMNDO |
| TV Guide | TVGC |
| Mosaic | - |

| Service ID | SUID | Satellite | Transponder | Button Number | PMT PID | ISO Language Description | Set Audio Enumeration |
|---|---|---|---|---|---|---|---|
| 147 | 147 | A | 12 | 1 | 0x1026 | ita | ALT_ITA |
| 209 | 209 | A | 15 | 2 | 0x1024 | esl | ALT_ESL |
| 208 | 18 | A | 15 | 3 | 0x1027 | fra | AL_FRA |
| 105 | 56 | A | 17 | 4 | 0x1025 | deu | ALT_DEU |
| 129 | 131 | A | 4 | 5 | 0x1023 | jpn | ALT_JPN |
| 835 | 835 | B | 9 | 6 | 0x1028 | eng | ALT_ENG |
| 102 | 101 | B | 13 | 7 | - | - | - |
| 19006 | 30052 | - | - | - | - | - | - |

FIG. 7

METHOD AND SYSTEM FOR TOASTED VIDEO DISTRIBUTION

CROSS-REFERENCE TO RELATED APPLICATION

This application is a Divisional of U.S. patent application Ser. No. 11/463,214, filed Aug. 8, 2006, which claims the benefit under 35 U.S.C. §119(e) of U.S. Provisional Patent Application No. 60/707,504 filed Aug. 11, 2005, where these two applications are incorporated herein by reference in their entireties.

BACKGROUND

In some situations it is desirable to display multiple different streams of video on a single display device such as a television. For example, such a multiple display is useful to give a user the ability to quickly and visually determine what is on each of the displayed video stream. In another situation a user may need to quickly change between streams. Another situation arises when a user wishes to simultaneously watch multiple, related video streams such as watching different sporting events that occurring simultaneously or watching the same sporting event from different angles (via different video streams) simultaneously.

In order to provide this feature, some television systems are provided with picture-in-picture (PIP) capabilities. These systems have an advantage in that they can be installed by the viewer and work with any broadcast paradigm (terrestrial, cable, satellite) because they do not require a modification of any equipment or transmissions made at the broadcasting facility. However, PIP capabilities are expensive in that they require additional electronics in the form of additional tuners, memory and processing capabilities.

SUMMARY

Against this backdrop systems and methods have been developed for displaying multiple different video streams on a single display device such as a television. The systems and methods disclosed transmit a composite channel to a receiver. The composite channel may be a static channel that contains different original channels of content in different locations on a displayed page, or may be a dynamic channel that is processed by the receiver to display a multiple different video streams on a single display device.

In one aspect, the disclosure may be considered a method for displaying a plurality of video streams on a single display. The method includes receiving a plurality of video streams, in which each video stream including a different stream of data and generating a single, composite stream of video data from the received video streams. The composite stream includes at least some of each of the different streams of data and the composite stream of video data renderable to simultaneously display at least a portion of each of the plurality of video streams on the single display. The method further includes transmitting, to a receiver connected to the display, the composite stream of video data on a carrier frequency and transmitting on the same carrier frequency a plurality of audio streams, in which each audio stream associated with a different one of the plurality of video streams.

In another aspect, the disclosure may be considered a method for displaying a plurality of video streams on a single display device. The method includes transmitting, to a receiver attached to a display device, a plurality of first video streams to a receiver, in which each first video stream being a different stream of high resolution video data and simultaneously transmitting to the receiver at least one second video stream, in which each second video stream including low resolution video data derived from one or more of the first video streams.

In yet another aspect, the disclosure may be considered a method for displaying a plurality of video streams on a single display device. The method includes receiving on a first carrier frequency a composite stream of video data. The composite stream includes at least some data from each of the plurality of video streams and the composite stream of video data renderable to simultaneously display at least a portion of each of the plurality of video streams on the single display. The method further includes receiving on the first carrier frequency a plurality of audio streams, in which each audio stream associated with a different one of the plurality of video streams. The method further includes receiving a first user selection of a first one of the plurality of audio streams and delivering a first display signal to the display device, the first display signal including a display stream renderable by the display device to display at least a portion of each of the plurality of video streams on the display device and the first display signal further including audio data generated from the first one of the plurality of audio streams.

In yet another aspect, the disclosure may be considered a method for rendering a plurality of video streams on a display device. The method includes receiving on a first carrier frequency a plurality of low resolution video data streams, in which each low resolution video data stream generated from an associated high resolution video data stream, and receiving on the same first carrier frequency a plurality of audio streams, in which each audio stream associated with a different one of the high resolution video streams. The method further includes receiving, via first user input, a selection of a one or more of the plurality of low resolution video streams and first one of the plurality of audio streams and generating a first composite stream of data, in which the first composite stream of data including each of the selected one or more of the plurality of low resolution video streams and the selected first one of the plurality of audio streams. In addition, the method includes delivering the first composite stream to the display device, thereby rendering on the display device each of the selected one or more of the plurality of low resolution video streams and the selected first one of the plurality of audio streams.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

FIG. 7 illustrates an embodiment of mapping the different audio components for each toasted channel with the audio components for language services for the single composite channel.

DETAILED DESCRIPTION

Figure 1:
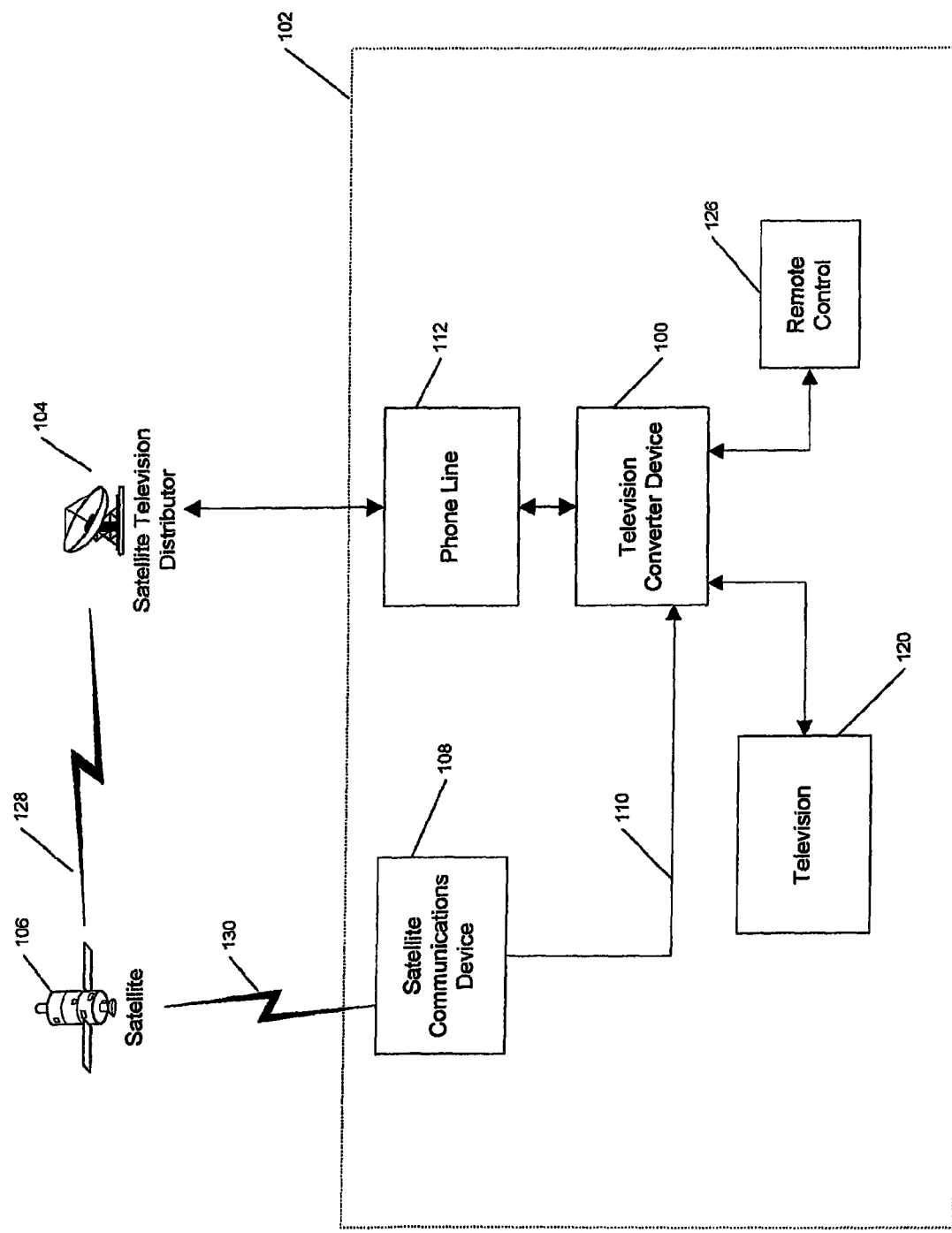
FIG. 1 presents an embodiment of an entertainment system that includes a television converter device in the form of a satellite set-top-box.

In this specification, embodiments of the present invention will be described using methods and systems related to subscriber satellite television service. This detailed description is not meant to limit the invention to any specific embodiment. The present invention may also be applicable to cable television systems, broadcast television systems or other television or video distribution systems. The present invention is also described in terms of digital video recorder (DVR) devices. The present invention may also be applicable to digital-versatile-disc (DVD) recording devices or other television recording devices. One skilled in the art will recognize that the present invention can apply elsewhere. While the invention has been particularly shown and described with reference to following embodiments hereof, it will be understood by those skilled in the art that various other changes in the form and details may be made therein without departing from the spirit and scope of the invention.

As a general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and DVR.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy.

Turning now to the Drawings, wherein like numbers denote like parts throughout the several views, FIG. 1 presents an embodiment of an entertainment system 102 that includes a television converter device 100 in the form of a satellite set-top-box. Generally, the satellite set-top-box 100 may receive one or more television signals from a cable television distributor, from a broadcast television distributor or from a satellite television distributor 104. In this embodiment, entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe the entertainment system 102, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

Figure 2:
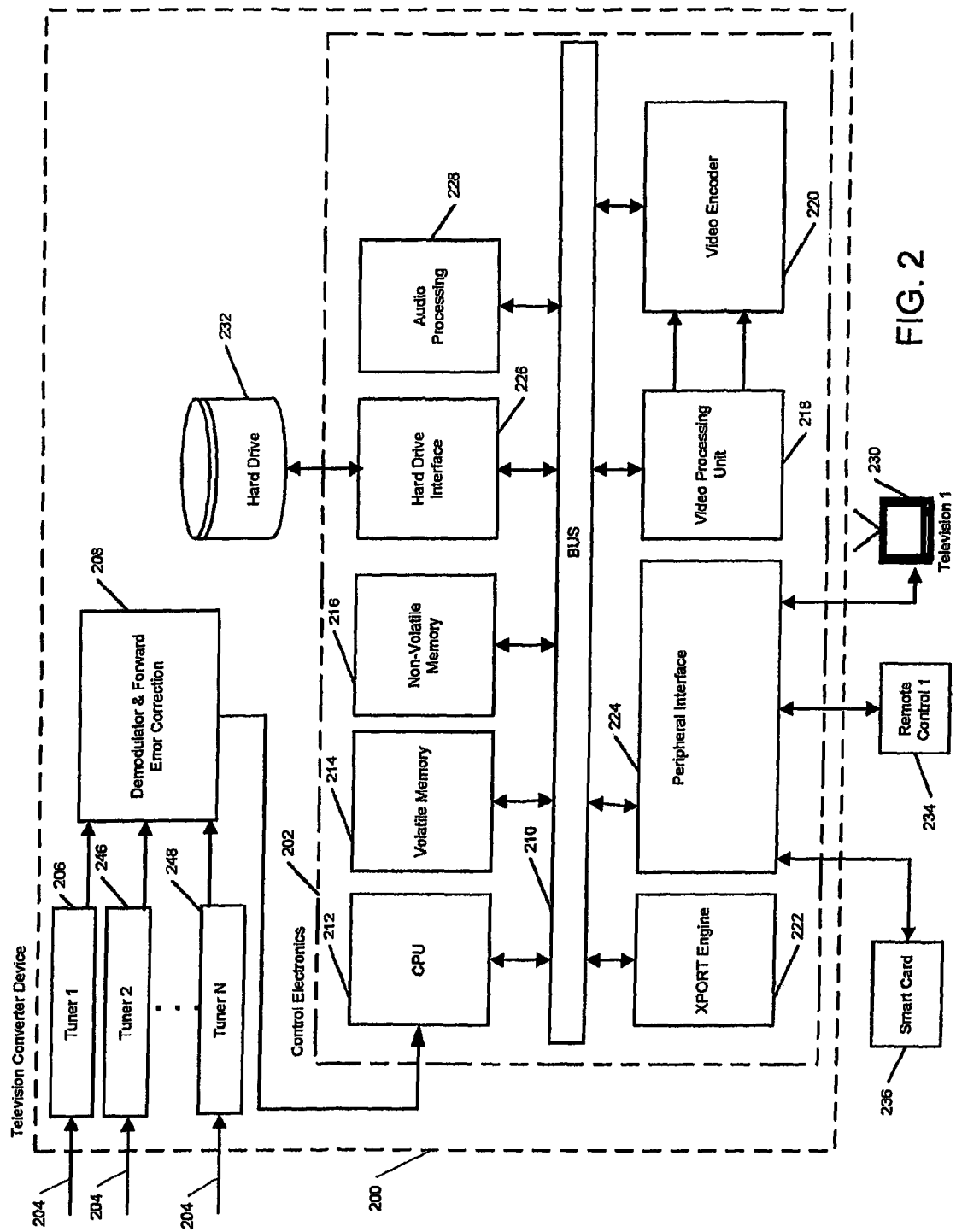
FIG. 2 provides a high level block diagram for the satellite television converter device with DVR functionality.

FIG. 2 provides a high level block diagram for the satellite television converter device 100, 200 with DVR functionality in accordance with an embodiment of the present invention.

The signal 110, 204 that arrives at the satellite set top box 200 may undergo extensive processing. The television converter 200 may include one or more tuner devices 206, 246, 248 that may receive a satellite signal 204. In this embodiment, tuner devices 206, 246, 248 acquire a satellite signal 204 from satellite television distributor 104. Tuner devices 206, 246, 248 may initially process the satellite signal 204. Tuner device 206, 246, 248 may also receive subscriber commands in the form of signals from control electronics unit 202. Signals from control electronics unit 202 may include, but is not limited to, a signal to tune to a transponder as part of the process of selecting a certain channel for viewing on a peripheral device. One skilled in the art would recognize that the tuner devices 206, 246, 248 may include fewer, more, or different components.

After receiving the signal 204, one of the first steps may be to demodulate 208 the signal 204. The signal 204 may arrive as an analog signal that "carries" data (e.g., data is modulated onto the analog signal). Demodulation 208 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 204 may be possible. Another one of the first steps may also be to error check 208 signal 204. One example of error checking 208 is forward error checking (FEC). FEC 208 may include, but is not limited to, inspecting parity bit or bits that may accompany signal 204. One skilled in the art will recognize that many methods for error checking are possible. For the purposes of discussion, an embodiment using digital data will be discussed below. However, one skilled in the art will recognize that systems with analog data or combined analog and digital data are also possible and contemplated herein.

In this embodiment, satellite set-top-box 200 contains control electronics unit 202 that receives satellite signal 204. One skilled in the art will recognize that control electronics 202 may receive other signals, including, but not limited to, signals from a cable or broadcast television distributor. One example of a control electronics unit 202 is the STMicroelectronics STi5517 Low-Cost Interactive Set-top Box Decoder, Part No. 7424736A. In this embodiment, control electronics unit 202 includes discrete electronic components combined into a single circuit with a shared bus 210. In other embodiments, control electronics unit 202 may be configured differently. For example, one or more of the control electronics unit 202 components in set-top-box 200 may be combined or omitted. The control electronics unit 202 may use a custom ASIC, such as from the LSILogic G11 family, or FPGA, such as from the Altera Stratix™ family. As a further example, one or more of the control electronics unit 202 components in set-top-box 200 may not share a bus 210, but may nonetheless be operatively connected by some other means. One skilled in the art will recognize that other configurations of set-top-box 200 and control electronics unit 202 are possible and within the scope of this invention. One skilled in the art will further recognize that some components of set-top-box 200 and control electronics unit 202 may be implemented in hardware or software. The control electronics unit 202 may operate under the control of a software program, firmware program, or some other program stored in memory or control logic. One skilled in the art will also recognize that the control electronics unit 202 may include other electronic components or structures to mediate or process signals.

Control electronics unit 202 may contain one or more central-processing-units (CPUs) 212 or processors. In this embodiment, control electronics unit 202 contains a single CPU 212 that is operatively connected to the shared bus. In this embodiment, CPU 212 may be used, among other things, for logical operations for set-top-box 200 functions including, but not limited to, channel selection, recording control, EPG display and control and system maintenance. Examples of commercially available CPUs 212 include the STMicroelectronics Enhanced ST20 32-bit VL-RISC, Motorola 68000 or Intel Pentium processors. One skilled in the art will recognize that the CPU 212 may be integrated with memory or other discrete electronics components.

Control electronics unit 202 may contain one or more volatile memory components 214. Volatile memory components 214 may include, but are not limited to, one or more SDRAM memory chips. Similarly, control electronics unit 202 may also contain one or more non-volatile memory components 216. Non-volatile memory 216 may include one or more memory chips, including, but not limited to, ROM, SRAM, SDRAM and Flash ROM. One skilled in the art will recognize that volatile memory 214 and non-volatile memory 216 may be integrated within other electronics components. One skilled in the art will also recognize that other memory components may be included within set-top-box 200 and control electronics unit 202. One skilled in the art will recognize that memory 214, 216 may be used for many purposes, including, but not limited to, storing EPG data and storing data for use by CPU 212.

In this embodiment, signal 204 is in digital form (e.g., a digital stream) after demodulation and error correction. For example, digital stream 204 may use, but is not limited to using, the digital video broadcasting (DVB) transport standard. The digital stream 204 may be multiplexed and therefore require demultiplexing by XPORT Engine 222. Demultiplexing 222, or demuxing, may include separating the bits of data into separate digital data streams. The digital streams may be packetized. Thus, the multiplexing of the separate digital data streams may not be bit-by-bit but packet-by-packet. The packet size may vary or may be constant. After demuxing 222 the packets, the separate digital data streams may be reassembled by placing related packets together in a continuous data stream 204.

Each of the separate digital data streams may also be encoded. Encoding is a method for representing data. Encoding may allow the data to be compressed. Compression can provide the system with increased bandwidth. One skilled in the art will recognize that several different encoding formats are possible. In satellite television, encoding formats may include the MPEG, MPEG2 or MPEG4 standards. Beyond the raw data, the separate digital data streams may include forward error correction, headers, checksums, or other information. All of this different information may be included in the digital television signal 204 processed by the satellite set-top-box 100. Control electronics unit 202 may therefore include one or more video processing units 218 that, among other video processing operations, may decode encoded signal 204. In this embodiment, video processing unit 218 may include, but is not limited to, a graphics processor, MPEG-2 decoder and a display compositor with separate on-screen display (OSD) control for peripheral devices. One skilled in the art will recognize that video processing unit 218 may also include other electronics, including, but not limited to, alpha blending, antialiasing, antiflutter and antiflicker filters, memory and video-rendering components.

Another discrete electronic component of control electronics unit 202 may be a video encoder unit 220. Video encoder unit 220 may work in combination with or independently from video processing unit 218. Video encoding unit 220 may encode digital stream 204 for output to one or more peripheral devices, including, but not limited to, a television. For example, video encoding unit 220 may encode digital stream 204 for RGB, CVBS, Y/C and YUV outputs. Encoding may allow program data to be compressed. In this embodiment, video encoder 220 may translate digital stream into a signal using the NTSC, PAL or SECAM standards. One skilled in the art will recognize that video encoder unit 220 may include other functionality, may be integrated into other electronic components of satellite set-top-box 200, and may encode digital stream 204 using other standards, including, but not limited to, MPEG and MPEG2.

Control electronics unit 202 may also include one or more storage interfaces or hard drive interfaces 226 and storage devices or hard drives 232. In this embodiment, television converter device 200 contains a hard drive interface 226 and hard drive 232. Hard drive 232 may be used for many purposes, including, but not limited to, storing recorded programs, buffering currently-playing programs (e.g., buffering a program may allow a user to pause or rewind a program), storing EPG data, storing commands or functions for the control electronics unit 202, storing timers or record events, and storing data for other devices within or connected to the satellite STB 200. In the embodiment of FIG. 2, the connection to the storage device 232 is shown to illustrate the capability of the STB 200 to store television programming as temporary and persistent recordings. In the embodiment the storage device 232 provides the long-term storage functionality of the STB (i.e. records and stores persistent recordings and may also include operating system software and other data or software necessary to the STB 200) and the short-term storage functionality (i.e. records and stores temporary recordings). The storage device 232 may include, for example, one or more devices, such as hard drives, as well as supporting hardware and software. In the embodiment of FIG. 2, all temporary and persistent recordings are located on the storage device 232. In the embodiment shown, the hard drive 232 comprises an 80 GB 'winchester' hard drive connected to the control electronics via a standard IDE/EIDE interface cable. As another example, hard drive 232 may be used to temporarily store data for processing by CPU 212. In this example, the hard drive 232 may allow the processor 212 to separate EPG data arriving as part of digital stream 204. One skilled in the art will recognize that other storage devices and interfaces may be substituted for hard drive interface 226 and hard drive 232 and are within the scope of this invention. One skilled in the art will also recognize that hard drive interface 226 and hard drive 232 may separately or together include an integrated memory (e.g., a memory buffer, commonly known referred to as cache) and additional processing components or logic. One skilled in the art will also recognize that hard drive interface 226 may be integrated into peripheral interface 224 (described below). Finally, one skilled in the art will recognize that hard drive 232 may be external and connected to satellite STB 200. For example, an external hard drive 232 may be connected to satellite STB 200 using USB 2.0 or IEEE 1394 (FireWire) connections. Such an external hard drive may include a screen for portable viewing of programming stored on it. Furthermore, in embodiments of the present invention, the storage device 232 contains expansion slots, such as IDE connections, for the provision of additional storage devices to provide additional capacity at a later time. In addition, some embodiments include connections for external storage devices such as DVD-Rs that provide the capability of using the external devices as if they were an internal storage device. The design and operation of hard drives and similar devices are well known in the art and need not be described further here.

An audio processing unit 228 may also be part of the control electronics unit 202. Audio processing unit 228 may decode the digital stream 204 for output to peripheral devices, including, but not limited to, a stereo, television speakers or portable audio or video players. For example, audio processing unit 228 may decode MPEG-1 layers I/II and layer III, Dolby Digital, Dolby ProLogic, SRS/TruSurround encoded audio in digital stream 204. Audio processing unit 228 may include one or more processors, memory components or digital to audio converter (DAC) systems. One skilled in the art will recognize that other audio processing components and functionality may be accomplished using audio processing unit 228.

A satellite set-top-box 200 may be connected to one or more peripheral electronic devices through peripheral interface 224. These peripheral devices may include a stereo, television 230, smart card 236, VCR, or other devices. In this embodiment, entertainment system 102 minimally contains, but is not limited to, a television 230 and smart card 236. Television 230 may serve many purposes, including, but not limited to, displaying television programming, displaying the EPG, displaying timer conflicts, and displaying other types of data, graphics and programming. Peripheral devices may receive and/or send signals from the satellite set-top-box 200. For instance, the television 230 may receive video and audio signals and a stereo may receive only audio signals. A camcorder, on the other hand, may send video or audio signals to the satellite set-top-box 100 or receive audio and video signals from the set-top-box to record. As another example, peripheral interface 224 may include a processor or other electronic components to permit an interface to content security devices such as an external "smart card." In this example, peripheral interface 224 may then encrypt or decrypt content for output to other peripheral devices. Thus, peripheral interface 224 may perform one or more functions for multiple peripheral devices, including, but not limited to, the synchronous or asynchronous transfer of data between different peripheral devices (e.g., decrypting content using a smart card peripheral device and outputting decrypted content to a television at the same time). One skilled in the art will recognize that the peripheral devices may include many types of commercially available electronic devices.

The entertainment system 102 may also include a remote control 126, 234 peripheral device, also sometimes referred to as a remote. The remote control 234 may be used to send commands to the satellite set-top-box 200. The remote control 234 may send commands via a wireless connection using, for example, infrared or UHF transmitters within the remote control 234. One example of an embodiment of a remote controller 234 is the EchoStar Technologies Corporation 721 Platinum Plus Remote, Part Number 121150, that includes an IR transmitter and an ultra high frequency (UHF) transmitter. The remote control 234 may be able to send signals to other peripheral electronic devices that form part of the entertainment system 102, including, but not limited to, a television, stereo, VCR, or DVD player. The set-top-box 200 may also be able to send signals to the remote control 234, including, but not limited to, signals to configure the remote control 234 to operate other peripheral devices in entertainment system 102. In some embodiments, the remote control 234 has a set of Light Emitting Diodes (LEDs). Some remote controls may include Liquid Crystal Displays (LCDs) or other screens. The remote control may include buttons, dials, or other man-machine interfaces. While the remote control 234 may often be the common means for a subscriber to communicate with the satellite set-top-box 200, one skilled in the art will recognize that other means of communicating with the set-top-box 200 are available, including, but not limited to attached keyboards, front panel buttons or touch screens.

The satellite set-top-box 200 may also include a remote control interface. A remote control interface may include any means for the user to communicate to the satellite set-top-box 200, and may be implemented using the peripheral interface 224 of control electronics unit 202 or by connecting a peripheral remote control interface device. A remote control interface may receive commands from one or more remote controls 234. Remote control 234 may use infrared, UHF, or other communications technology. The remote control interface may therefore translate an input from the user into a format understandable by the control electronics unit 202. The translation systems may include, but are not limited to, electronic receivers and electronic relays. One skilled in the art will recognize that other means to receive and translate user inputs are possible.

Another peripheral device and connection to the satellite set-top-box 200 may include a phone line and modem. Set-top-box 200 may use a modem and phone line to communicate with one or more outside entities or systems (e.g., satellite television distributor 104). The phone line may carry local or long-distance telephone service. One skilled in the art will recognize that the phone line may also carry other services, including, but not limited to, DSL service. These communications may include requesting pay-per-view programming, reporting of purchases (for example, pay-per-view purchases), obtaining updates to subscriber programming (e.g., updating EPG data), or receiving updates to software on the satellite set-top-box 100. For example, the phone line may communicate with the satellite set-top-box 100 using an RJ-11 style telephone connection. One skilled in the art will recognize that there are many other uses for this phone line connection. For example, EPG data may be transmitted to set-top-box 200 via phone line or in the satellite signal 204. One skilled in the art will recognize that the EPG data may be transmitted to set-top-box 200 by various other methods, systems and outside entities. Also, one skilled in the art will recognize that a phone line connection to satellite distributor 104 may represent other communication connections, including, but not limited to, wireless, Internet, or microwave communications connections. Another function of the phone line may be to periodically receive the EPG data. One skilled in the art will also recognize that a phone line connection may permit networked communications with other network-ready devices using the telephone wiring within a subscriber's location.

A satellite set-top-box 200 may also include network connectivity. For example, peripheral interface 224 may include components or interfaces that permit the connection of RJ-45 cabling and transmission of TCP/IP traffic to other connected devices. As another example, a wireless router may be attached via peripheral interface 224 to allow wireless local-area-network (WLAN) data communications using a standard wireless networking protocol such as WiMAX, 802.11b or 802.11g. One skilled in the art will recognize that various other network connections to the set-top-box 200 are possible.

Figure 3:
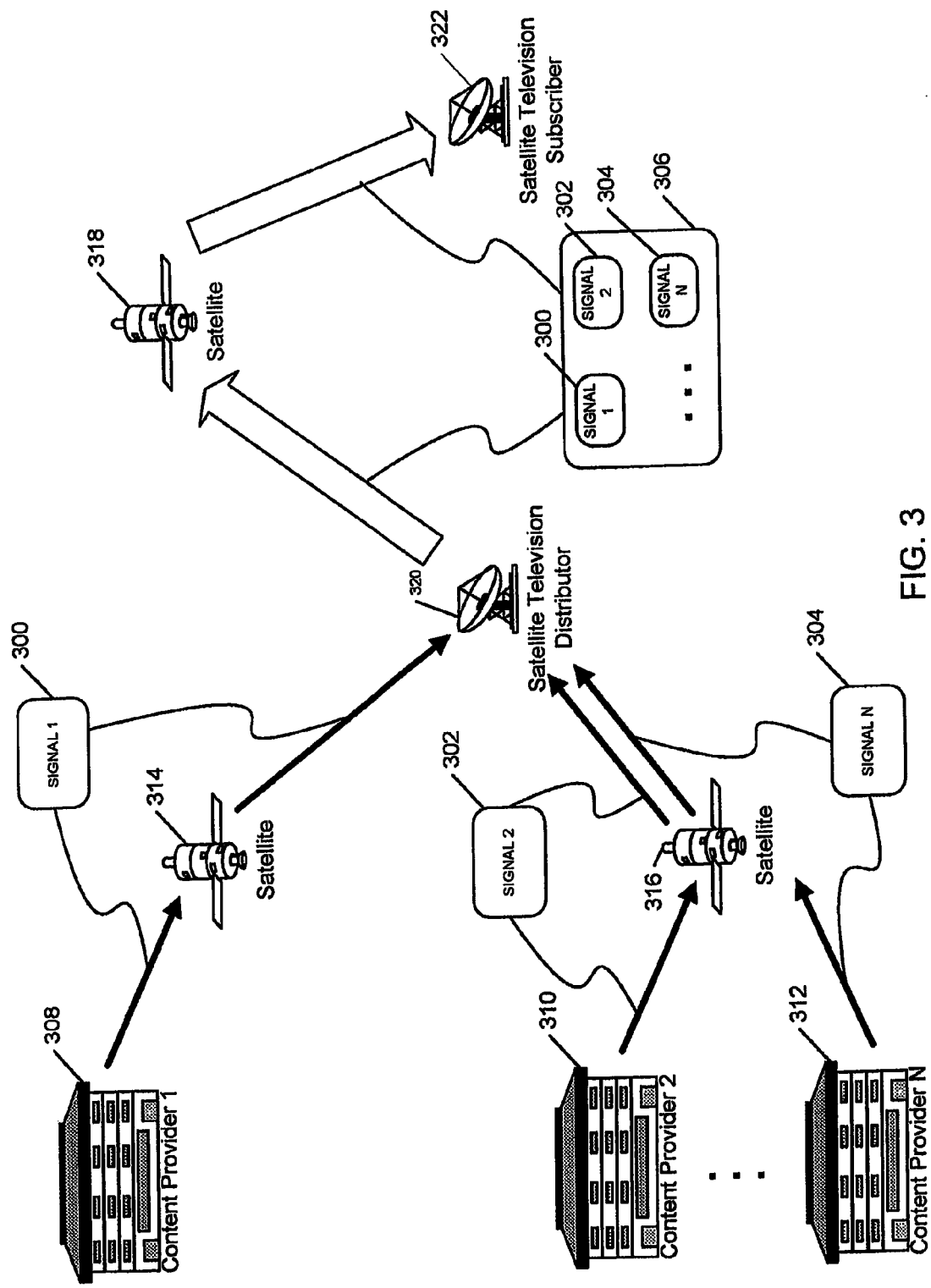
FIG. 3 presents one embodiment of a toasted video distribution system.

FIG. 3 presents one embodiment of a toasted video distribution system. As set forth in the embodiment of FIG. 3, content providers 308, 310 and 312 may provide video, audio or data channels 300, 302 and 304 to a satellite television distributor 320 via satellites 314 and 316. One skilled in the art will recognize that channels 300, 302 and 304 may transport video, audio and/or data in many forms, including, but not limited to, transportation in the form of packetized, RF or other types of signals. One skilled in the art will also recognize that channels 300, 302, and 304 may be transmitted to satellite television distributor 320 by many kinds of communications networks, including, but not limited to, satellite, cable, telephone, wireless networks. As represented by content provider "N" 312 and channel "N" 304, one skilled in the art will further recognize that the number of content providers and signals transmitted to satellite television distributor 320 may be limitless. One skilled in the art will also recognize that channels 300, 302, and 304 may be transmitted as real-time channels, time-delayed channels, time-accelerated channels, or a combination thereof. One skilled in the art will also recognize that at each stage of the transmission process the data embodying a channel 300, 302, 304, and 306 may be altered, manipulated or converted to different forms or formats. For the purposes of this disclosure, the reader will understand that the data for a channel received from a content provider and the data for that same channel as transmitted to the receiver will be referred to without differentiation even though the actual format of the data may vary considerably.

As set forth in the embodiment presented in FIG. 3, satellite television distributor 320 receives channels 300, 302, and 304. In the present embodiment, the satellite television distributor 320 creates and transmits a single or multiple composite channel(s) 306 that may be comprised, in part, of channels 300, 302, and 304, in addition to separately transmitting channels 300, 302, 304 to the subscriber 322. In order to differentiate the original channels 300, 302, and 304 from the composite channel(s) 306 transmitted to the subscriber 322, the channels 300, 302, and 304 will be occasionally referred to as "original" channels 300, 302, and 304. One skilled in the art will recognize that composite channel 306 may be comprised, in whole or in part, of the video, audio and/or data elements from channels 300, 302 and 304 and other elements, including, but not limited to, text, graphics, images, data and/or executable code. By way of illustration, and not of limitation, as set forth by the current embodiment, the composite channel 306 may be comprised of three video and audio elements corresponding to channels 300, 302 and 304, as well as a background image, closed-captioning, EPG and interactive data.

As presented in FIG. 3, satellite television distributor 320 may receive compressed channels 300, 302 and 304 from content providers 308, 310 and 312. Examples of signal compression include, but are not limited to, channels compressed according to the MPEG-2 or MPEG-4 standards. One skilled in the art will recognize that many other compression standards and techniques are available to compress channels 300, 302 and 304. Alternatively, satellite television distributor 320 may receive uncompressed channels. By way of example, and not of limitation, uncompressed channels may include analog or baseband signals comprised of video, audio or other data.

In the present embodiment, satellite television distributor 320 may create a composite channel 306 from baseband channels 300, 302 and 304. Satellite television distributor 320 may use industry-standard video and/or audio production hardware and/or software to create a composite channel 306 from such baseband channels. Alternatively, or in addition to using baseband channels, satellite television distributor 320 may also create a composite channel 306 using, in whole or in part, compressed channels. Use of compressed channels, for example where channels are compressed according to the MPEG-2 standards, may require satellite content distributor 320 to synchronize MPEG-2 encoders for the composite channel 306 to produce the same I-frame simultaneously or at approximately the same time. Alternatively or in addition, for some or all incoming channels used to create composite channel 306, the satellite television distributor may need to generate I-frames within a compositor when other channels have sufficient data to represent an I-frame.

Composite channel(s) 306 may take the form of a static channel, a dynamic channel or a combination of static and dynamic channels. A static channel refers to a virtual channel that contains all the necessary video information encoded as one channel. As such, it is tuned to and treated by a receiver in the same manner as any other virtual channel, such as CNN, HBO, etc. A dynamic channel, on the other hand, refers to a channel that must require some additional processing by the receiver (e.g., processing not normally required to display a static channel) to generate the video signal for the television or other display device. One skilled in the art will recognize that composite channel 306 may take other forms.

In an embodiment of the toasted video display system, the composite channel may be rendered in conjunction with the execution of an interactive software module. The interactive software module may be used to create the background, frames and interactive elements of the display and also monitor and interpret any user commands received while the composite channel is being displayed. For example, in an embodiment, the interactive software module may be executed upon user command to display the composite channel. The composite channel is then tuned to and the video data processed by the interactive software module to create the composite display (such as display 306, 402 of FIG. 3 or 4). If the composite channel is a static channel, the interactive software may create any video not derived from the original channels including any labels, frames and control elements like buttons. If the composite channel is a dynamic composite channel, the interactive software module may manage the placement and selection of the individual low resolution channels in addition to the generation of any background, labels, frames and control elements like buttons. The interactive software module may be stored on the receiver 200 or may be continuously "looped," that is repeatedly streamed, to the receiver 200 until such time as the module is executed in response to a user selection of a composite channel.

In one embodiment, satellite television distributor 320 may create a static composite channel 306 by decompressing compressed channels 300, 302 and 304 into their respective baseband constituent parts or formats, and then compressing a combination of channels 300, 302 and 304 into a single composite channel 306 that is transmitted to a satellite television subscriber 322. As set forth in FIG. 7, a satellite television distributor 320 may associate the audio components for each respective channel 300, 302 and 304 with the audio components for language services for the single composite channel 306. For example, a composite channel 306 may use its Italian audio component ("ita") for carrying primary audio, for example English-language audio, associated with an "NBC" channel 300 and its Spanish audio component ("esl") for carrying primary audio associated with an "MSNBC" channel 302. One skilled in the art will recognize that the association of primary audio from channels 300, 302 and 304, may, but need not, correspond to any particular audio component of a composite channel 306. By carrying the primary audio for channels 300, 302 and 304 on audio components of composite channel 306, the satellite television distributor 320 may optimize delivery of the composite signal 306 such that delivery occurs via a single satellite transponder. Alternatively, or in addition, satellite television distributor 320 may reference audio components that are carried on one or more different transponders, or the same transponder, for channels 300, 302 and 304. In this embodiment, the composite channel 306 may be comprised of statically encoded video from channels 300, 302 and 304 and references to the audio components for associated channels that may be transmitted from different sources, including, but not limited to, transmission via different satellites. Additionally, as set forth in the present embodiment, satellite television distributor 320 may down-convert, down-res, modify or otherwise alter the quality or properties of the video components from channels 300, 302 and 304 that is encoded into composite channel 306. For example, in one embodiment, the satellite television distributor 320 may degrade the decompressed baseband video from channels 300, 302 and 304 when encoding composite channel 306.

In another embodiment, satellite television distributor 320 may create a dynamic composite channel 306 by decompressing compressed channels 300, 302 and 304 into their respective baseband constituent parts or formats, and then compressing a combination of channels 300, 302 and 304 into multiple groups of single composite channels 306 that are transmitted to a satellite television subscriber 322. In one embodiment, the multiple groups of static composite channels 306 may then be dynamically combined by a subscription television subscriber's 322 television converter device 200, e.g., by an interactive software module as described above. Alternatively, as another embodiment, satellite television distributor 320 may create a dynamic composite channel 306 by decompressing compressed channels 300, 302 and 304 into their respective baseband constituent parts or formats, and then compressing a degraded version (e.g., a low resolution version) of each channel 300, 302 and 304 individually into separate static channels 306 that are each independently transmitted to a satellite television subscriber 322. Upon receipt, the satellite television subscriber's 322 television converter device 200 may automatically, or via manual subscriber commands, assemble, compose or present the channels 300, 302 and 304 in a custom arrangement. For example, the subscriber may select different low resolution channels to be displayed and, in response, the receiver takes the video data from each selected low resolution channel and places it within a mosaic pattern or other frame (see FIG. 4). As an example of the present embodiment, a subscriber may select the arrangement of a certain channel or sets of channels and/or the subscriber may also associate their preferred audio components for a given display. In an embodiment where multiple composite channels 306 are transmitted to a satellite television subscriber 322, the satellite television distributor may utilize one or more transponders on one or more satellites.

As set forth in FIG. 3, the composite signal(s) 306 received by a satellite television subscriber 322 may be handled in various ways by television converter devices 200 with and without DVR functionality. Memory present in television converter devices 200 may permit user arrangement and user selection of subsets of dynamic composite signals. For embodiments comprising a television converter device with DVR functionality 200, the DVR may be used to buffer, pause, record or enable trick modes for a static composite channel 306. Alternatively, for dynamic composite channel (s) 306, the television converter device with DVR functionality 200 may permit the buffering, pausing, recording or enablement of trick modes for one or more dynamic composite channel(s) 306. The television converter device with DVR functionality 200 may also permit the buffering, pausing, recording or enablement of trick modes for the entire static composite signal 306. A television converter device with DVR functionality 200 also permits a satellite television distributor 320 to buffer the composite signal(s) 306 for synchronizing and building a single composite display.

Additionally, as set forth in FIG. 3, the use of multiple tuner devices 206, 246, 248 on television converter device 200 may permit a satellite television distributor 320 to utilize multiple transponders (e.g., one transponder per tuner). In one embodiment, multiple tuner devices 206, 246, 248 on television converter device 200 would permit the transmission of thematic or other types of subsets of composite channels. In another embodiment of multiple tuner devices 206, 246, 248 on a television converter device with DVR functionality 200 one tuner may be used to display the static or dynamic composite signal 306 while one or more other tuners are used to buffer, pause, record or otherwise enable trick modes for selected channels or sets of channels.

One skilled in the art will recognize that creation of composite signal 306 may supplement, change or remove the attributes and/or properties of signals 300, 302 and 304. One skilled in the art will also recognize that embodiments of a dynamic composite signal 306 may require separate decoders for each frame, decoders that work faster than real-time or buffering to a television converter device with DVR functionality to build structures around frames to create the appearance of a toasted video display.

Figure 4:
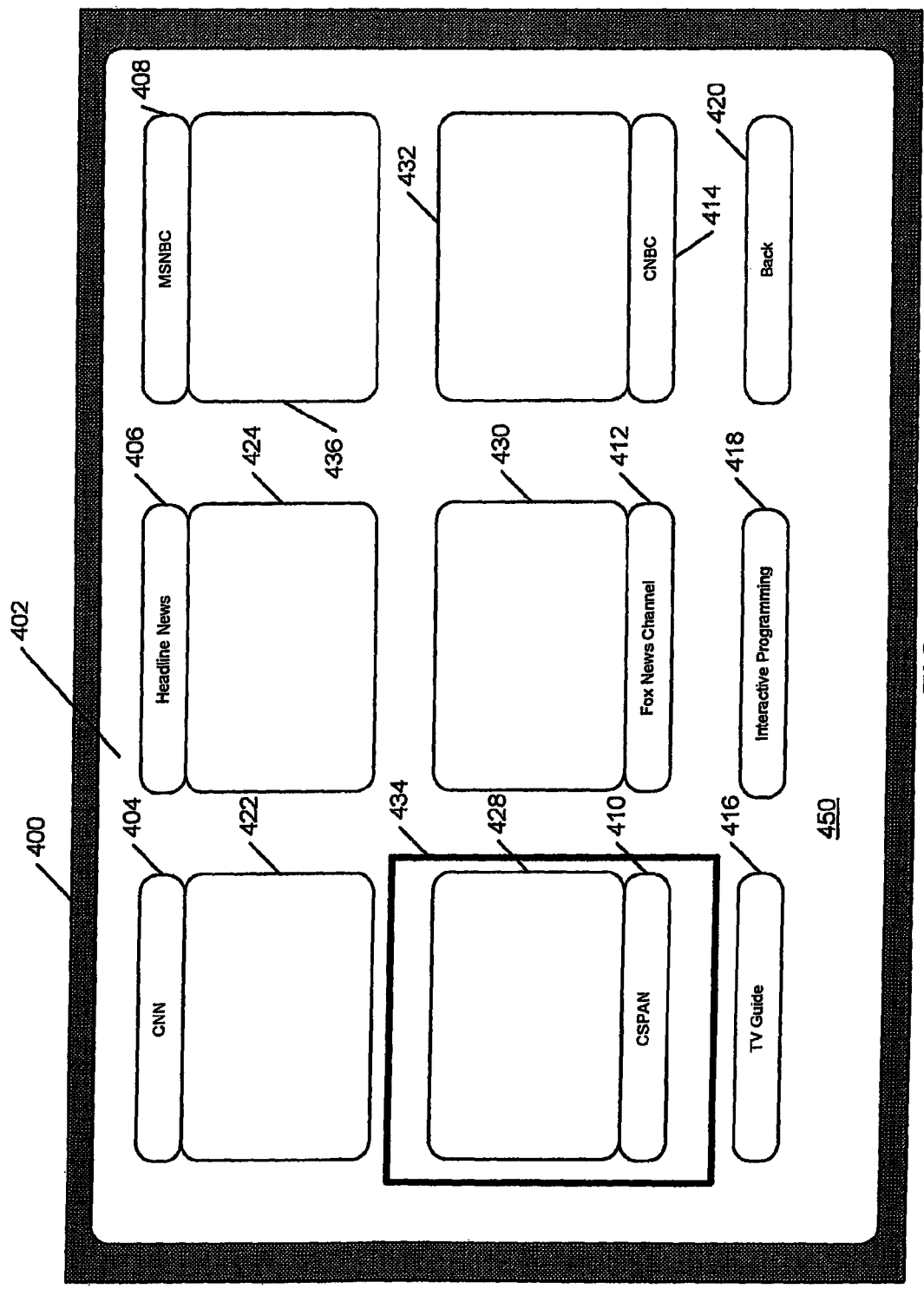
FIG. 4 shows one embodiment of the composite signal as would be displayed on a television.

FIG. 4 shows one embodiment of the composite signal 306, 402 as would be displayed on a television 400. In this embodiment, composite signal 402 includes, but is not limited to, six video channels displayed in different frames 422, 424, 436, 428, 430 and 432. The six video channels 422, 424, 436, 428, 430 and 432 may be arranged in a mosaic pattern situated in front of a background 450 as shown. The mosaic pattern may be a pre-generated page with frames for displaying each video channel 422, 424, 436, 428, 430 and 432 within the background 450. Alternatively, the mosaic pattern may have no background, each of the video channels 422, 424, 436, 428, 430 and 432 being displayed in a different area of the display with or without a border between the areas. Note also that each display area need not be the same size. For example, if only three video channels are being "toasted" (i.e., displayed on different portions of one screen or display device), one of the three channels (e.g., the channel with the current focus) could be displayed within the bottom half or a left or right half of the mosaic.

Each of the channels 422, 424, 436, 428, 430 and 432 of this embodiment are associated with graphical labels 404, 406, 408, 410, 412 and 414 identifying the network name associated with the video channel. In addition, user selectable button icons 416, 418 and 420 are also provided, each for performing a different trick function or other function by the receiver, such bringing up a menu, such as the channel guide menu or an audio selection menu.

Another element of the toasted video system is the handling of audio data. In an embodiment, a user viewing the composite channel 402 is able, through a controller for the receiver, to change and select the audio for any one of the displayed video channel 422, 424, 436, 428, 430 and 432. In an embodiment, this may be achieved though user selection of the audio channel selection button 418. In an alternative embodiment, this may be done by allowing the user to change the "focus" of the receiver, such as via user inputs generated by manipulation of an up or down arrow on a user's controller, such as the remote 234. Changing focus may result in a different colored border 434 being displayed around the frame in focus and the delivery of the audio associated with the channel 422, 424, 436, 428, 430 and 432 currently in that frame. Alternatively, the audio may be changed in response to a user selection of a particular frame by changing focus to that frame and pressing the "select" button. In an embodiment, the receiver may interpret the audio selection command, whatever it may be, as a command to change the primary audio component to a different language component, as described above with reference to FIG. 7, resulting in the audio stream assigned to that component to be played, which in this case is the audio corresponding to the channel 422, 424, 436, 428, 430 and 432 currently in focus.

A user viewing the composite display 402 may also select to view the full screen, which could also be a high resolution version, of any one of the toasted channels. Such a user selection may be made via the user shifting focus to a given frame and pressing the "enter" key or performing some other action on a controller for the receiver 200. Alternatively, some other combination of keystrokes or inputs may be used. In any case, in response to the valid user selection the receiver 200 tunes to the appropriate carrier frequency (if different) and acquires the streamed video data for the selected original channel. As discussed elsewhere, the transmitted original channel may include a high resolution video data stream or may include more data (i.e., data for a larger display area) than that contained in the composite channel 306.

Similarly, a user viewing the composite display 402 may also be able to initiate other features of the receiver 200 with respect to the display. For example, the user may be able use trick functions such as rewind, pause and fast forward on the composite display 402. If the receiver is provided with two or more tuners, the receiver 200 may be able to record, in response to user commands, the original channel associated with one of the toasted channels 422, 424, 436, 428, 430 and 432. In addition, the receiver may be able to record the composite channel along with all of the associated audio for each of the toasted channels. Thus, allowing a user to replay the composite channel and switch between audio during the replay.

In yet another embodiment, if the receiver is provided with only one tuner, the receiver may still be able to record, in response to user commands, the original channel associated with one of the toasted channels 422, 424, 436, 428, 430 and 432 as long as that original channel is carried on the same carrier frequency as the composite channel. To facilitate this, composite channels and their associated original channels may be preferentially bundled onto the same carrier frequencies where possible. Such bundling would also eliminate any tuner delay caused when a user switches between the composite display 402 and display of a single original channel. Thus, for example, a football game may be transmitted as a set of different original channels each showing a different view of the game and a single composite channel of the different original channels. These channels would be multiplexed into one data stream and modulated onto the same carrier frequency so that the receiver need not tune to a different carrier frequency when switching between views. Provided that the data acquisition and buffer capabilities were sufficiently large, the receiver may also buffer all of the data received on the carrier frequency so that trick functions would be possible for all of the channels received on the carrier frequency.

Figure 5:
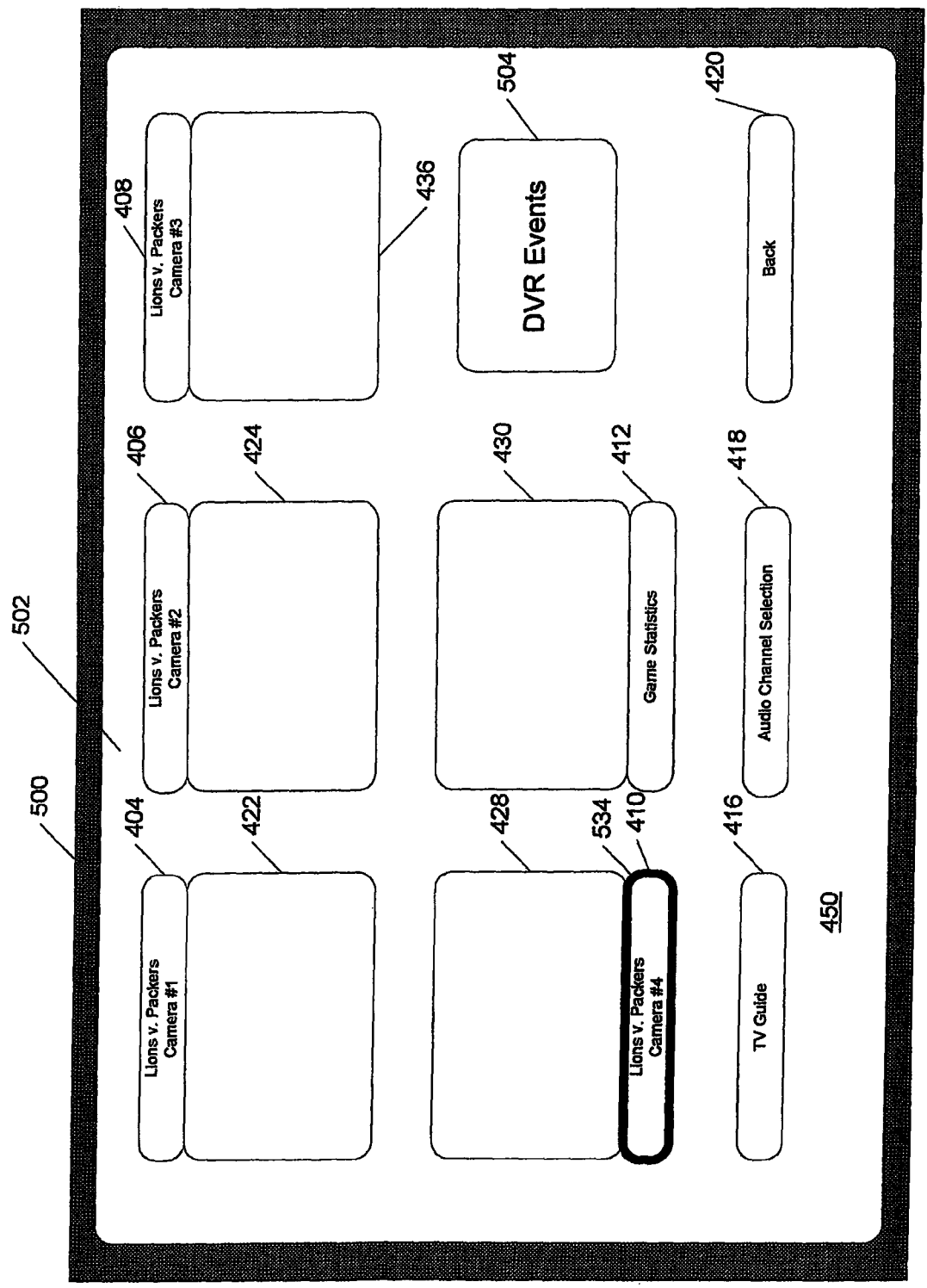
FIG. 5 shows another embodiment of the selection element.

FIG. 5 shows another embodiment of the focus element 534. In addition, FIG. 5 illustrates a menu 504 in one of the locations within the composite display 502.

In an alternative embodiment, user selection to display one of the toasted channels 422, 424, 436, 428, 430 and 432 in the composite display 402 results in the receiver 200 tuning to the selected original channel 300, 302, 304 and causes the interactive software module, if any, to cease execution. In an embodiment, should the user wish to return to the composite display 402, any such software may need to be re-executed in order for the display 402 to be reconstructed from the transmitted composite channel(s) 306.

Figure 6:
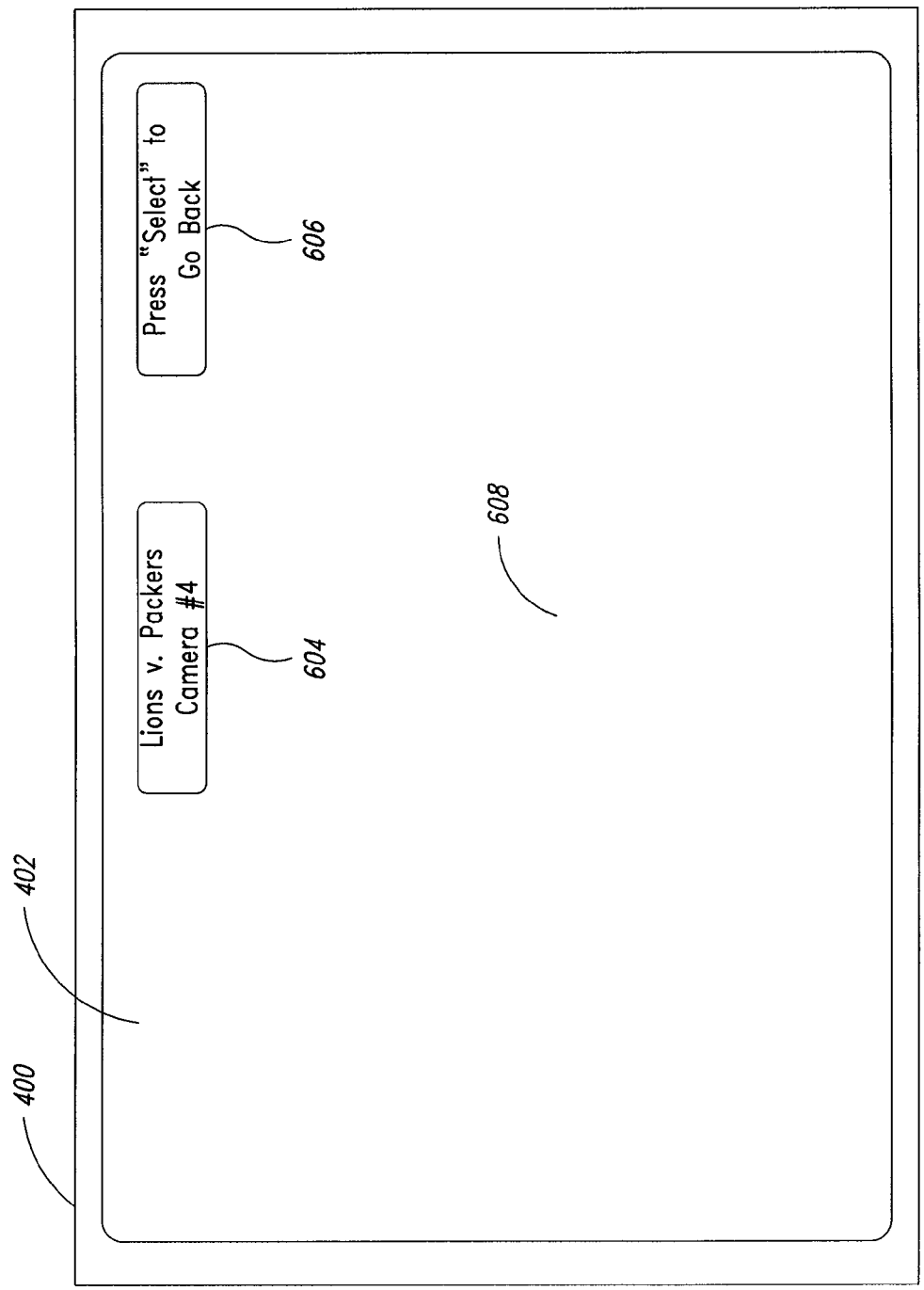
FIG. 6 shows a return system for returning control from a full-screen or primary channel selection to the composite signal.

FIG. 6 illustrates an embodiment of a display for returning control from a full-screen or original channel display 602 to the composite display 402 without the need to re-execute any interactive software module used. In the embodiment, user selection to display one of the toasted channels 422, 424, 436, 428, 430 and 432 in the composite display 402 results in the receiver 200 tuning to the original channel, however the interactive software module remains in operation and provides the display 602 as shown. The full screen video 608 is derived from the high resolution video of the original channel. Overlaid on the full screen video 608 are one or more (two are shown) display elements 604, 606 generated by the interactive software module. In the embodiment shown, a first display element 604 is a label indicating the channel being displayed. The second display element is a user selectable control in the form of a button 606 that returns the system to displaying the toasted display 402. The interactive software module may be designed to cease execution after a period of time, thus removing the display elements 604, 606 after a period of time. The system described above allows the user to quickly return to the toasted display without the need to re-execute the interactive software module.

Figure 8:
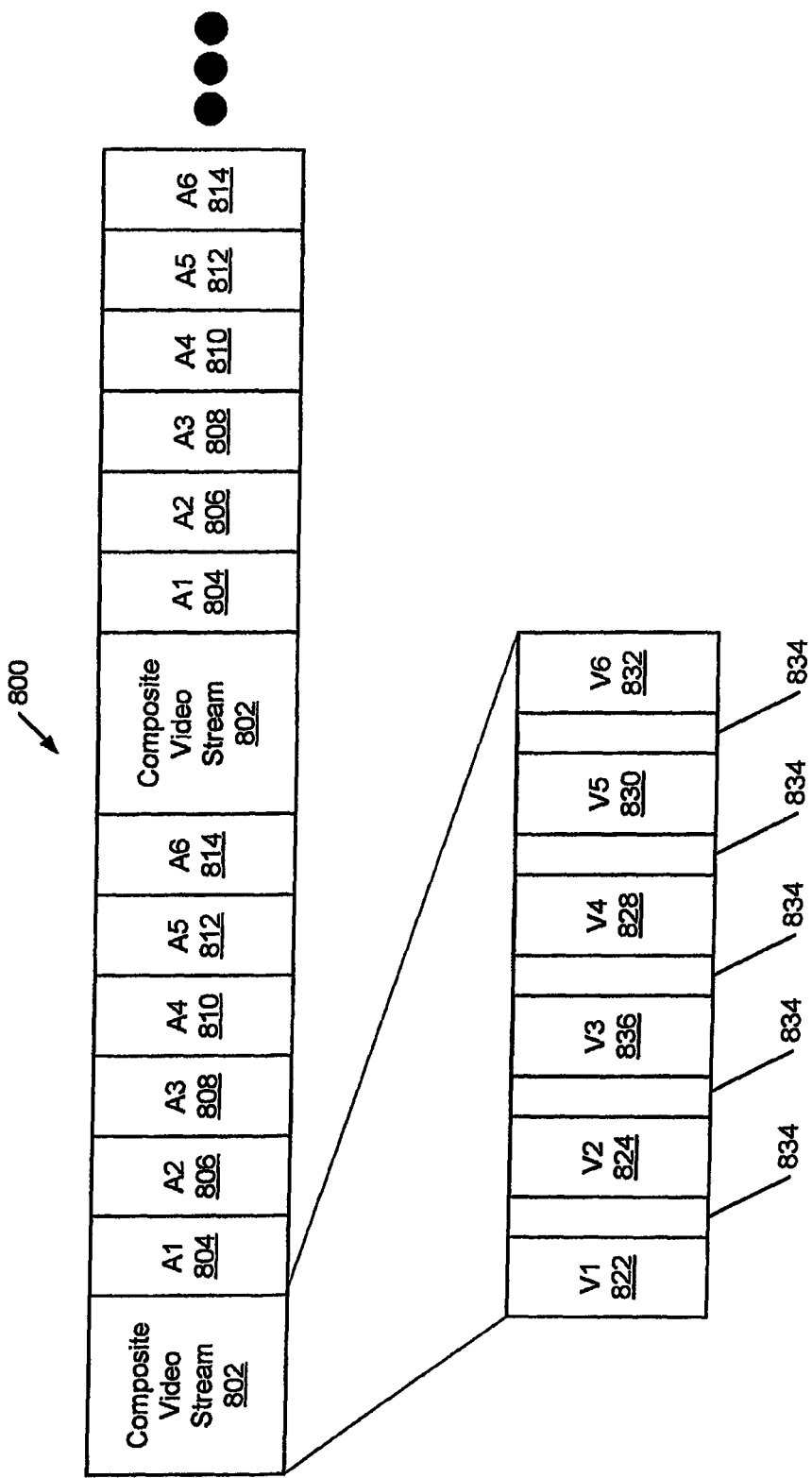
FIG. 8 illustrates an embodiment of the transmitted data for a composite channel in the form of a static channel containing a mosaic of six original channels.

FIG. 8 illustrates an embodiment of the transmitted data for a composite channel in the form of a static channel containing a mosaic of six original channels. FIG. 8 shows a composite stream 800 of video data 802 multiplexed with audio streams 804, 806, 808, 810, 812, and 814 of audio data, as could be modulated onto a single carrier frequency for transmission to, and receipt by a receiver. One skilled in the art will recognize that more streams, such as video and audio streams for other channels could also be multiplexed into the streams shown in FIG. 8 when the composite stream 800 is transmitted. One skilled in the art will further recognize that other data elements, such as data headers and identifiers, as are known in the art may be included as necessary to meet the transmission and video data format requirements.

The composite stream 800 is a static channel stream in that the streamed composite video data 802 contains all or substantially all of the video data necessary to render the toasted video display as shown in FIG. 4. Thus, the video data 802 of the static channel may be processed and displayed in the same manner as an original channel transmitted to the receiver. As such, the streamed composite video data 802 is a stream of data derived from the data of, in this case, six different original channels 300, 302, and 304. Thus, as illustrated in FIG. 8, the streamed composite video data 802 may include separately identifiable sections or streams of video data 822, 824, 836, 828, 830 and 832 each derived from the data of a different original channel and ultimately used to generate video in a different frame 422, 424, 436, 428, 430 and 432 of the composite display 402. In addition, the composite video data 802 may also include video data 834 for the background, frame borders, labels or other video features of the display 402 that are not part of the low resolution channel video data 822, 824, 836, 828, 830 and 832.

In an embodiment, the separately identifiable sections or streams of video data 822, 824, 836, 828, 830 and 832 contain low resolution video data that was derived at the uplink facility from the high resolution video data for the original channels received from the content providers 308, 310 and 312.

In an embodiment, the audio streams 804, 806, 808, 810, 812, and 814 of audio data are the same streams as those received from the content providers 308, 310 and 312 or, alternatively, the same streams as those generated for transmission with the original channel 300, 302, and 304 to the receiver. Note that, in an embodiment in which the original channels, i.e., the high resolution video data and associated audio data for the original channels, are already being provided via different transponders (i.e., modulated onto different carrier frequencies), the audio streams 804, 806, 808, 810, 812, and 814 are in fact being transmitted to the receiver twice: once with the original channel and once with the composite channel. This allows the audio to be rendered for any of the low resolution channels displayed by the composite channel via a receiver having only one tuner. Such duplication is necessary due to the fact that a single tuner can not acquire data from two different frequencies at one time.

Figure 9:
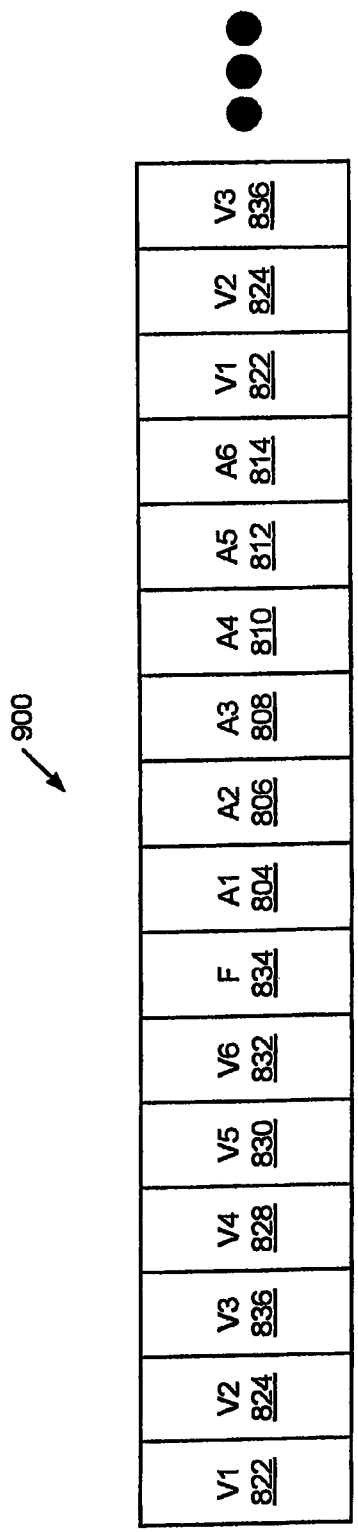
FIG. 9 illustrates an embodiment of the transmitted data for a composite channel in the form of a dynamic channel.

FIG. 9 illustrates an embodiment of the transmitted data for a composite channel 900 in the form of a dynamic channel. In the embodiment shown, each of the streams of low resolution channel video data 822, 824, 836, 828, 830 and 832 are maintained as a separately identifiable video stream that can be recognized and manipulated by the receiver. The composite channel 900 may further include other video data 834, such as background, frame and label video data, to reduce the processing load on the receiver. Alternatively, such data may be generated by the receiver as part of the manipulation of the separate composite channel streams 822, 824, 836, 828, 830 and 832 to create the display 402. As described above with reference to FIG. 8, the audio streams 804, 806, 808, 810, 812, and 814 are provided with the composite video streams 822, 824, 836, 828, 830 and 832 even though such audio data may also be transmitted to the same receiver via a different carrier frequency with the high resolution channel.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
simultaneously transmitting, by a satellite television distributor, to a converter device attached to a display device:
   a plurality of original channels, each original channel including high resolution video data and audio data; and
   at least one composite channel in the form of a dynamic channel, each composite channel including:
      video data of a plurality of low resolution video streams encoded as one channel, each low resolution video stream derived from an associated original channel, for which a composite display of the video data is renderable in conjunction with execution of an interactive software module that manages placement and selection of the plurality of low resolution video streams; and
      corresponding audio streams associated with each original channel, so as to permit a viewer of the display device to select a corresponding audio signal for any one of the displayed video data without changing the focus of the converter device; and
repeatedly transmitting to the converter device the interactive software module that manages placement and selection of the plurality of low resolution video streams until the interactive software module is executed on the converter device in response to a user selection of the at least one composite channel.

2. The method of claim 1, further comprising:
receiving, by the converter device, a first user input to display the at least one composite channel on the display device;
tuning, by the converter device, to receive the at least one composite channel;
receiving the at least one composite channel; and
processing, by the converter device, video data of the at least one composite channel for simultaneously displaying the plurality of video streams encoded in the at least one composite channel in different regions of a display page.

3. The method of claim 1 wherein the satellite television distributor transmits a plurality of composite channels, each composite channel including video data of a plurality of low resolution video streams encoded as one channel, each low resolution video stream derived from an associated original channel.

4. The method of claim 3 further comprising:
receiving, by the converter device, a first user input selecting two or more of the plurality of composite channels for display in a certain arrangement on the display device;
receiving, by the converter device, a second user input selecting an audio component for the certain arrangement;

rendering by the converter device, the plurality of low resolution video streams encoded in the selected two or more of the plurality of composite channels in the certain arrangement on the display device; and simultaneously rendering by the converter device, the audio component for the certain arrangement on the display device.

5. The method of claim 1 further comprising:
receiving, by the satellite television distributor, source data from one or more content providers;
processing, by the satellite television distributor, the received source data to generate the plurality of original channels;
degrading each of the plurality of original channels into an associated low resolution video stream; and
compressing a combination of low resolutions video streams into the composite channel for transmission.

6. The method of claim 2, wherein processing video data further comprises:
creating background for the display page; and
creating interactive elements of the display.

7. The method of claim 2 further comprising:
monitoring and interpreting any user commands received while the composite channel is being displayed.

8. The method of claim 1 wherein the audio streams are transmitted as components of one or more composite channels.

9. The method of claim 1 wherein delivery of each composite channel occurs via a single satellite transponder.

10. The method of claim 1 wherein the at least one composite channel includes references to audio components for associated channels that are transmitted via different satellite transponders.

11. A non-transitory computer readable storage medium having computer-executable instructions stored thereon for displaying a plurality of video streams on a single display device, the instructions, when executed by a microprocessor, causing a satellite television distributor to:
transmit simultaneously to a converter device attached to the display device:
a plurality of original channels, each original channel including high resolution video data and audio data;
at least one composite channel, each composite channel including video data of a plurality of low resolution video streams encoded as one channel, each low resolution video stream derived from an associated original channel; and
corresponding audio streams, associated with each original channel so as to permit a viewer of the display device to select a corresponding audio signal for any one of the displayed video channels without changing the focus of the converter device; and
repeatedly transmit to the converter device an interactive software module that manages placement and selection of each of the low resolution video streams until the interactive software module is executed on the converter device in response to a user selection of the at least one composite channel.

12. The non-transitory computer readable storage medium of claim 11, wherein the computer-executable instructions, when executed by a microprocessor, further cause a converter device to:
receive a first user input to display the at least one composite channel on the display device;
tune to receive the at least one composite channel; and
process the video data of the at least one composite channel for simultaneously displaying the plurality of video streams encoded in the at least one composite channel in different regions of a display page.

13. The non-transitory computer readable storage medium of claim 11 having further computer-executable instructions stored thereon that, when executed by a microprocessor, further cause the converter device to:
receive a first user input selecting two or more of the plurality of composite channels for displaying in a certain arrangement on the display device;
receive a second user input selecting an audio component for the certain arrangement;
render the plurality of low resolution video streams encoded in the selected two or more of the plurality of composite channels in the certain arrangement on the display device; and
simultaneously render the audio component for the certain arrangement on the display device.

14. The non-transitory computer readable storage medium of claim 11 having further computer-executable instructions stored thereon that, when executed by a microprocessor, further cause the satellite television distributor to:
receive source data from a plurality of content providers;
process the received source data to generate the plurality of original channels;
degrade each of the plurality of original channels into an associated low resolution video stream; and
compress a combination of low resolution video streams into the composite channel for transmission.

15. The non-transitory computer readable storage medium of claim 12, wherein the computer-executable instructions, when executed by a microprocessor, further cause the converter device to:
create background for the display page; and
create interactive elements of the display.

16. A system for displaying a plurality of video streams on a single display device comprising:
a memory;
a converter device coupled to the display device; and
a processor operably coupled to the memory, the processor configured to:
transmit simultaneously to the converter device:
a plurality of original channels, each original channel being a different stream of high resolution video, and
at least one composite channel, in the form of a dynamic channel each composite channel including:
video data of a plurality of low resolution video streams encoded as one channel and derived from one or more of the plurality of original channels for which a composite display of the video data is renderable in conjunction with execution of an interactive software module that manages placement and selection of the plurality of low resolution video streams; and
corresponding audio streams, associated with each original channel so as to permit a viewer of the display device to select a corresponding audio signal for any one of the displayed video channels without changing the focus of the converter device; and
repeatedly transmit to the converter device the interactive software module that manages placement and selection of the plurality of low resolution video streams until the interactive software module is executed on the converter device in response to a user selection of the at least one composite channel.

17. The system of claim 16, wherein the converter device is configured to:
- receive a first user input to display the at least one composite channel on the display device;
- receive through a tuner the at least one composite channel; and
- process the video data of the at least one composite channel for simultaneously displaying the plurality of video streams encoded in the at least one composite channel in different regions of a display page.

18. The system of claim 16 wherein the processor transmits a plurality of composite channels, each composite channel including video data of a plurality of low resolution video streams encoded as one channel, each low resolution video stream derived from an associated original channel.

19. The system of claim 18 wherein the converter device is further configured to:
- receive a first user input selecting two or more of the plurality of composite channels for displaying in a certain arrangement on the display device;
- render in different areas on the display device, the plurality of low resolution video streams encoded in the selected two or more of the plurality of composite channels in the certain arrangement on the display device; and
- simultaneously rendering a selected audio data on the display device.

20. The system of claim 16 wherein the processor is further configured to:
- receive source data from one or more content providers;
- process the received source data to generate the plurality of original channels;
- degrade each of the plurality of original channels into an associated low resolution video stream; and
- compress a combination of low resolutions video streams into the composite channel for transmission.

21. The system of claim 17, wherein the converter device is further configured to perform the following:
- monitoring and interpreting any user commands received while the composite channel is being displayed.

* * * * *